US007672231B1

(12) United States Patent
Peterson et al.

(10) Patent No.: US 7,672,231 B1
(45) Date of Patent: Mar. 2, 2010

(54) SYSTEM FOR MULTIPLYING COMMUNICATIONS CAPACITY ON A TIME DOMAIN MULTIPLE ACCESS NETWORK USING SLAVE CHANNELING

(75) Inventors: Edward Douglas Peterson, El Cajon, CA (US); Gary Robert Huckell, San Diego, CA (US)

(73) Assignee: The United States of America as represented by Secretary of the Navy, Washington, DC (US)

( * ) Notice: Subject to any disclaimer, the term of this patent is extended or adjusted under 35 U.S.C. 154(b) by 266 days.

(21) Appl. No.: 11/924,455

(22) Filed: Oct. 25, 2007

Related U.S. Application Data

(63) Continuation of application No. 10/373,148, filed on Feb. 24, 2003, now Pat. No. 7,301,959.

(51) Int. Cl.
*H04L 12/26* (2006.01)
*H04L 12/43* (2006.01)

(52) U.S. Cl. ...................... 370/228; 370/458
(58) Field of Classification Search ................. 370/431, 370/436, 442, 443, 445, 464, 465, 468
See application file for complete search history.

(56) References Cited

U.S. PATENT DOCUMENTS

| 4,763,357 A | * | 8/1988 | Barr ........................... 380/266 |
| 5,355,374 A | * | 10/1994 | Hester et al. ................ 370/461 |
| 5,748,624 A | * | 5/1998 | Kondo ........................ 370/347 |
| 6,335,927 B1 | * | 1/2002 | Elliott et al. ................ 370/352 |
| 6,546,000 B1 | * | 4/2003 | Schroderus et al. ......... 370/347 |
| 6,687,239 B1 | * | 2/2004 | Koprivica ................... 370/341 |
| 6,704,572 B1 | * | 3/2004 | Whinnett et al. ......... 455/452.1 |
| 6,801,543 B1 | * | 10/2004 | Ployer ........................ 370/468 |
| 7,042,863 B1 | | 5/2006 | Morris |
| 7,054,947 B2 | * | 5/2006 | Yun ........................... 709/233 |
| 7,277,855 B1 | * | 10/2007 | Acker et al. ................ 704/260 |
| 7,613,146 B2 | * | 11/2009 | Manjeshwar et al. ........ 370/329 |
| 2001/0036161 A1 | * | 11/2001 | Eidenschink et al. ........ 370/316 |
| 2001/0043613 A1 | * | 11/2001 | Wibowo et al. ............ 370/468 |
| 2002/0024971 A1 | * | 2/2002 | Umayabashi ............... 370/468 |
| 2003/0016662 A1 | * | 1/2003 | Chen et al. .................. 370/389 |
| 2003/0072321 A1 | * | 4/2003 | Salloum Salazar et al. .. 370/442 |
| 2004/0047319 A1 | | 3/2004 | Elg |

* cited by examiner

*Primary Examiner*—Chi H Pham
*Assistant Examiner*—Warner Wong
(74) *Attorney, Agent, or Firm*—Kyle Eppele; Allan Lee; J. Eric Anderson

(57) ABSTRACT

A communications system comprising: at least two communications resource sets, wherein each resource set includes at least one communications resource; a communications terminal connected to each of the at least two communications resource sets for transmitting and receiving messages between the resource sets; a communications router operably coupled to each communications terminal; and a control processor configured to search within a periodic time frame comprising multiple time slots for an available time slot on a control channel at frequency $f_c$ or, if a time slot is not available on the control channel, to search within a periodic time frame comprising multiple time slots for an available time slot on a slave channel at frequency $f_c$.

9 Claims, 5 Drawing Sheets

SYSTEM FOR MULTIPLYING COMMUNICATIONS CAPACITY ON A TIME DOMAIN MULTIPLE ACCESS NETWORK USING SLAVE CHANNELING

CROSS-REFERENCE TO RELATED APPLICATION

This application is a continuation of U.S. application Ser. No. 10/373,148, filed 24 Feb. 2003, titled "System and Method for Multiplying Communications Capacity on a Time Domain Multiple Access Network Using Slave Channeling", which issued as U.S. Pat. No. 7,301,959 on Nov. 27, 2007, hereby incorporated by reference herein in its entirety for its teachings, and referred to hereafter as "the parent application." The following document is hereby incorporated by reference into this specification: SYSTEM AND METHOD FOR DETERMINING MESSAGE TRANSMISSION TIME FOR ESTABLISHING A COMMUNICATIONS LINK ON A TIME DOMAIN MULTIPLE ACCESS NETWORK, U.S. Pat. No. 6,301,262 B1, issued on Oct. 9, 2001.

BACKGROUND OF THE INVENTION

This invention relates generally to the field of communications network and, more particularly, to a system and method for multiplying communications capacity on a multi-channel network by allowing user communication paths on available non-controlled channels without additional hardware by using slave channeling.

Time Domain Multiple Access (TDMA) is the technique of dividing time on a channel into a sequence of frames, each consisting of a number of slots, and allocating one or more slots per frame for a logical communications path. Demand Assigned Multiple Access (DAMA) is a channel access and resource allocation technique that provides the dynamic sharing of one or more channels among multiple users or user networks.

In a DAMA system, user access is provided on an as-needed basis. When users require access, they transmit a request for channel resources on a common control signaling, i.e. orderwire, channel. If channel resources are available, the user is assigned access and can begin communicating. If resources are not available, the user may receive a busy indication or resources could be preempted from a lower priority user. When users complete communication, their channel resources are returned to a pool for reallocation to other users.

TDMA communications systems allow multiple users to communicate through a DAMA multiplexer over a network using a common communications path. A DAMA multiplexer is a TDMA connection between a user baseband device, such as a teletype, telephone, or fax and a communication system, such as a local area network (LAN) or satellite relay system. A DAMA multiplexer retains, sends, and receives data in a holding buffer until the specified time slot for communications occurs. The data is then burst in or out of the buffer at a much higher rate to facilitate a perceived constant communications path.

The DAMA multiplexed data stream is divided into periodic time frames, and each frame is further subdivided into segments as shown in FIG. 1. Some of the segments, e.g. CCOW, RCCOW, support the DAMA protocol. The A, B, and C segments support data communications, and they are further divided into time slots.

The Channel Control Order Wire (CCOW) slot is used to transmit system timing and control information from the channel controller to subscriber units only. The Return Channel Control Order Wire (RCCOW) slot provides limited orderwire capability for DAMA-related subscriber-to-channel controller communications. The Ranging Time slot is the time slot during which the user's DAMA multiplexer determines the range between the user terminal and the satellite to set the transmitter synchronization required for timing. The Link Test slot is used to evaluate the performance of the satellite link.

Data Time slots are the time slots during which users transmit or receive data. There are three segments of time slots in each frame, designated A, B, and C. The number of circuits in each segment depends on the baseband data rate, the forward correction rate, and the transmission burst rate, as influenced by the radio frequency interference (RFI) environment.

In U.S. Pat. No. 6,301,262, Peterson developed algorithms to create DAMA Semi-Automatic Controller (DAMA SAC), an automatic communications channel controller for UHF satellite communications (SATCOM). One channel controller is required for each satellite channel. Each DAMA SAC computer has the capability of controlling up to eight DAMA channels for its given coverage area. Hence, the invention in U.S. Pat. No. 6,301,262 allowed efficient automatic control (AC) mode use of UHF channels and considerably increased UHF SATCOM channel efficiency.

However, even with increased channel efficiency, there remains a need for increased communications capability. The number of controlled channels available for communications is still limited by the number of fielded channel controllers. This system and method for multiplying communications capacity on a TDMA network, using slave channeling, takes advantage of available non-controlled channels, channels that cannot be controlled due to lack of ground control equipment. If a time slot in which to send or receive a message is not available on a control channel and a time slot is available on a slave channel, then users receive and transmit their orderwire on the control channel and send or receive messages on the slave channel. Thus, a slave channel multiplies the communications capability of a network without the need for additional control channels.

SUMMARY OF THE INVENTION

This invention provides a system and method for multiplying communications capacity on a multi-channel network by allowing user communication paths on available non-controlled channels without additional hardware by using slave channeling.

The method comprises the steps of (a) receiving a request message from a first communications resource, the request message including a destination address that identifies a second communications resource; (b) searching within a periodic time frame comprising multiple time slots for an available time slot in which to transmit the first message on a control channel at frequency $f_c$, wherein the second communications resource is not scheduled to receive or transmit a second message during the available time slot; (c)(1) if the available time slot is identified on the control channel, transmitting the first message therein; (c)(2) otherwise, searching within a periodic time frame comprising multiple time slots for an available time slot in which to transmit the first message on a slave channel at frequency $f_s$; (d)(1) if the available time slot is identified on the slave channel, transmitting the first message therein; (d)(2) otherwise, repeating steps (c)(2)-(d)(2). If the available time slot is identified on the slave channel, the method further comprises the steps of: (e) transmitting orderwire information to the first and second communications resources on the control channel; and (f) transmitting the first message from the first communications resource to the second communications resource on the slave channel.

The communications system comprises at least two communications resource sets, each resource set including at least one communications resource; a communications terminal connected to each of the at least two communications resource set for transmitting and receiving messages between the resource sets; a communications router operably coupled to each communications terminal; and a control processor for searching within a periodic time frame comprising multiple time slots for an available time slot on a control channel at frequency $f_c$ or, if a time slot is not available on the control channel, searching within a periodic time frame comprising multiple time slots for an available time slot on a slave channel at frequency $f_s$. The control processor implements the method steps detailed above.

The invention may also be characterized as a computer program product for use with a communications system, the computer program product comprising a recording medium and the means, recorded on the recording medium, for directing the system to perform the above-described method steps.

BRIEF DESCRIPTION OF THE DRAWINGS

For a more complete understanding of the system and method for multiplying communications capacity on a TDMA network using slave channeling, reference is now made to the following detailed description of the embodiments as illustrated in the accompanying drawings, wherein.

DESCRIPTION OF THE EMBODIMENTS

Figure 1:
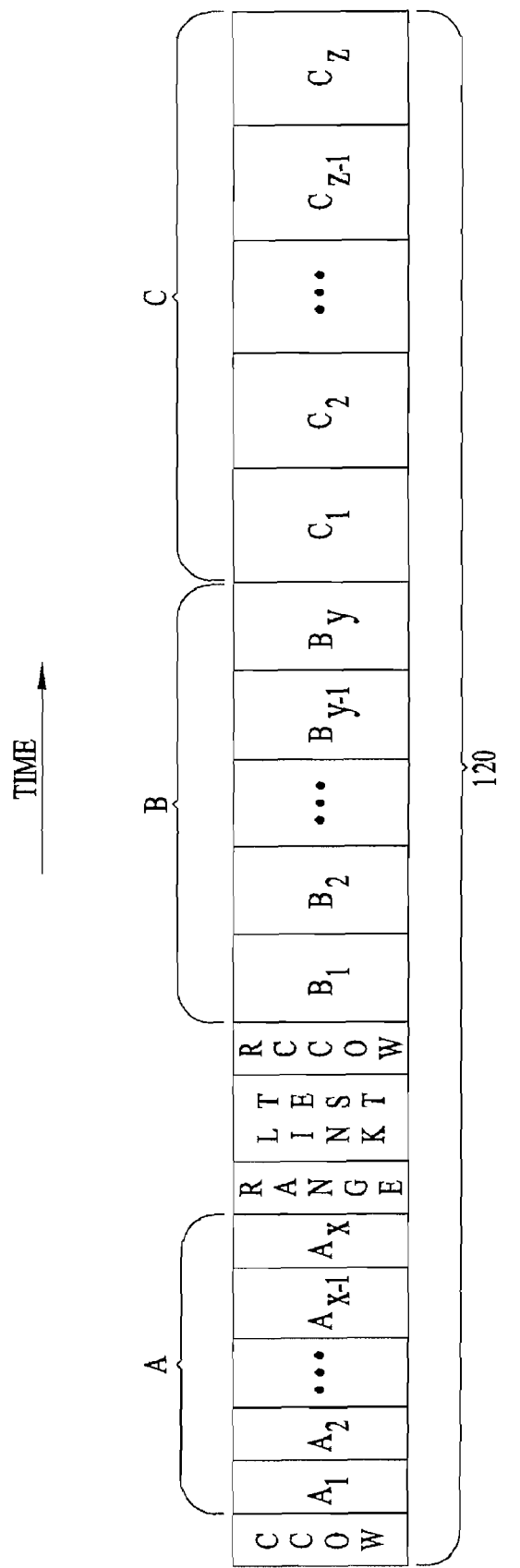
FIG. 1 illustrates a typical DAMA frame format.

In a TDMA network, messages are transmitted in predetermined time slots within a series of periodic time frames, where each time frame is further divided into a predetermined number of time slots. FIG. 1 shows a typical DAMA frame format. The CCOW and RCCOW segments support orderwire communications, and the range and link test segments support system functions. The A, B, and C segments, which are further divided into time slots, support data communications. The DAMA frame format is used as an example only, and it is therefore to be understood that a TDMA network may use other suitable frame formats.

Figure 2:
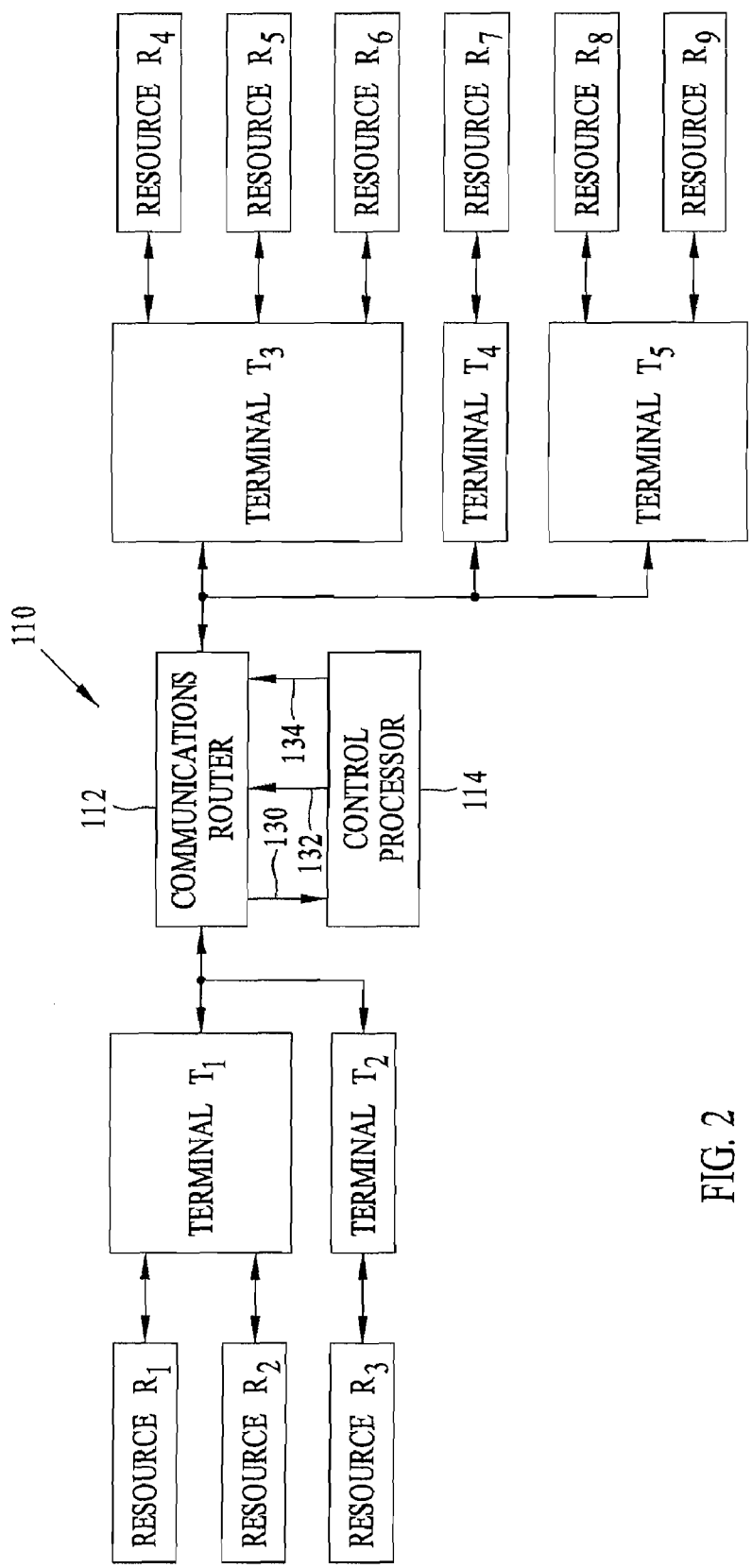
FIG. 2 is a block diagram of an example TDMA communications network.

FIG. 2 shows an example of a TDMA communications network 110 that comprises communications resources $R_1$-$R_9$, communications terminals $T_1$-$T_5$, communications router 112, and control processor 114. The configuration of communications network 110 is provided by way of example only, and it is therefore to be understood that network 110 may include any suitable number of communications terminals T and any suitable type and number of communications resources R connected to the terminals. Communications terminals T are transmitting and receiving stations that may be either full or half duplex stations, depending on the requirements of a particular network. Communications resources R (i.e., telephone, fax, computer, etc.) are operably coupled to a particular terminal T. Each terminal T has a unique base address, and each resource R has a sub-address. Communications router 112 is a message relay station and may be implemented, for example, as a communications satellite or as a local area network (LAN). Control processor 114 determines the appropriate time slots within a time frame in which a message may be transmitted on a control channel C at frequency $f_c$, or if no time slots are available on the control channel C, determines the appropriate time slots within a time a frame on at least one slave channel $S_1$-$S_m$ at frequencies $f_{s_1}$-$f_{s_m}$, associated with the control channel.

Figure 3:
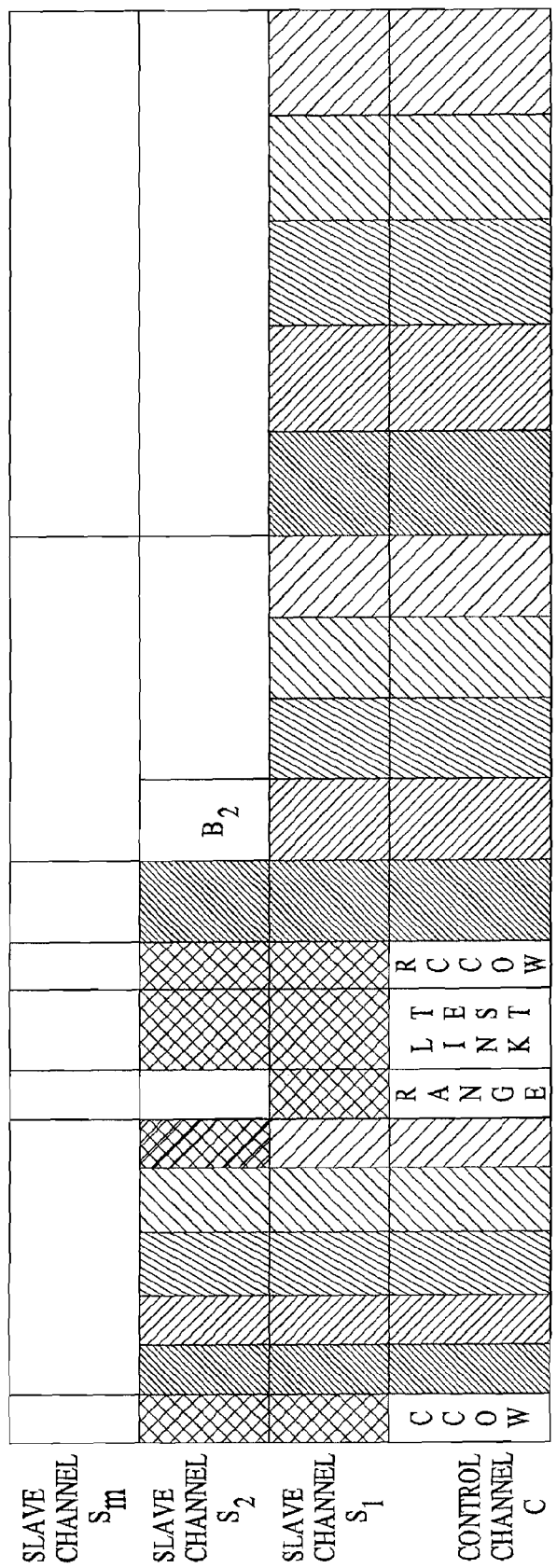
FIG. 3 is a diagram showing a control channel and slave channels over a single time frame.

In FIG. 3, a control channel C and slave channels $S_1$-$S_m$ over a single time frame are shown. Messages between the communications resources $R_1$-$R_9$ are communicated over control channel C or, if no time slots are available on control channel C, on at least one slave channel $S_1$-$S_m$ associated with control channel C. When an available time slot, for example, time slot $B_2$ on slave channel S2, the time slot is assigned for data communications and the required orderwire communications, CCOW and RCCOW, occur on control channel C.

Referring to FIG. 2, communications network 110 includes a network plan which comprises data stored in a memory 170 (shown in FIG. 4), of control processor 114 that may include information such as a sub-address of each resource R connected to a terminal. T, configuration data identifying the type of resource (i.e., telephone, fax, computer, etc.), data rate (e.g., 2400 baud), propagation time, time slot assignments, duplex type, operating channel for each resource R and terminal T on the network, and a base address for each terminal T.

Referring to FIGS. 1-4, in the operation of network 110, messages are communicated between resources R within specific time slots of a periodic time frame 120 divided into some suitable number of time slots, $A_1$-$A_x$, $B_1$-$B_y$, and $C_1$-$C_z$. When a request message 130 is sent, control processor 114 determines if messages may be sent between particular resources R identified in the message request 130; for example, from resource $R_1$ to resources $R_5$, $R_7$, and $R_9$. Message request 130 is generated by the particular resource R from which a message is to be generated, transmitted to communications router 112, and then directed to control processor 114. If a message may be sent between the requester resource $R_1$ to requested resources $R_5$, $R_7$, and $R_9$, control processor 114 determines the appropriate time slot of slots $A_1$-$A_x$, slots $B_1$-$B_y$, and slots $C_1$-$C_z$ within the present time frame 120 in which to send the message so that it may be received by the intended recipient resources such as, for example, any or all of the requested resources $R_5$, $R_7$, and $R_9$, when the requested resources are receptive to receiving the message.

If control processor 114 determines that a communications link cannot be established between particular resources R, control processor 114 generates a reject message 132 indicating that a communications link cannot be established. Reject message 132 is provided via communications router 112 to the particular terminal T connected to the resource R that initiated request message 130. If, however, control processor 114 determines that a communications link can be established between the particular resources R, control processor 114 generates a connect instruction 140 that is provided via communications router 112 to the particular terminal T connected to the resource R that initiated request message 130. Connect instruction 140 includes identification of the appropriate time slot of the present frame 120 during which the message is to be transmitted from the requester resource R and associated terminal T. Instead of a connect instruction 134, control processor 114 may generate a reject message 132 to the requester resource R indicating that no time slot is available during which a message may be transmitted that would be received by one or more of the intended message recipient resources R.

Figure 4:
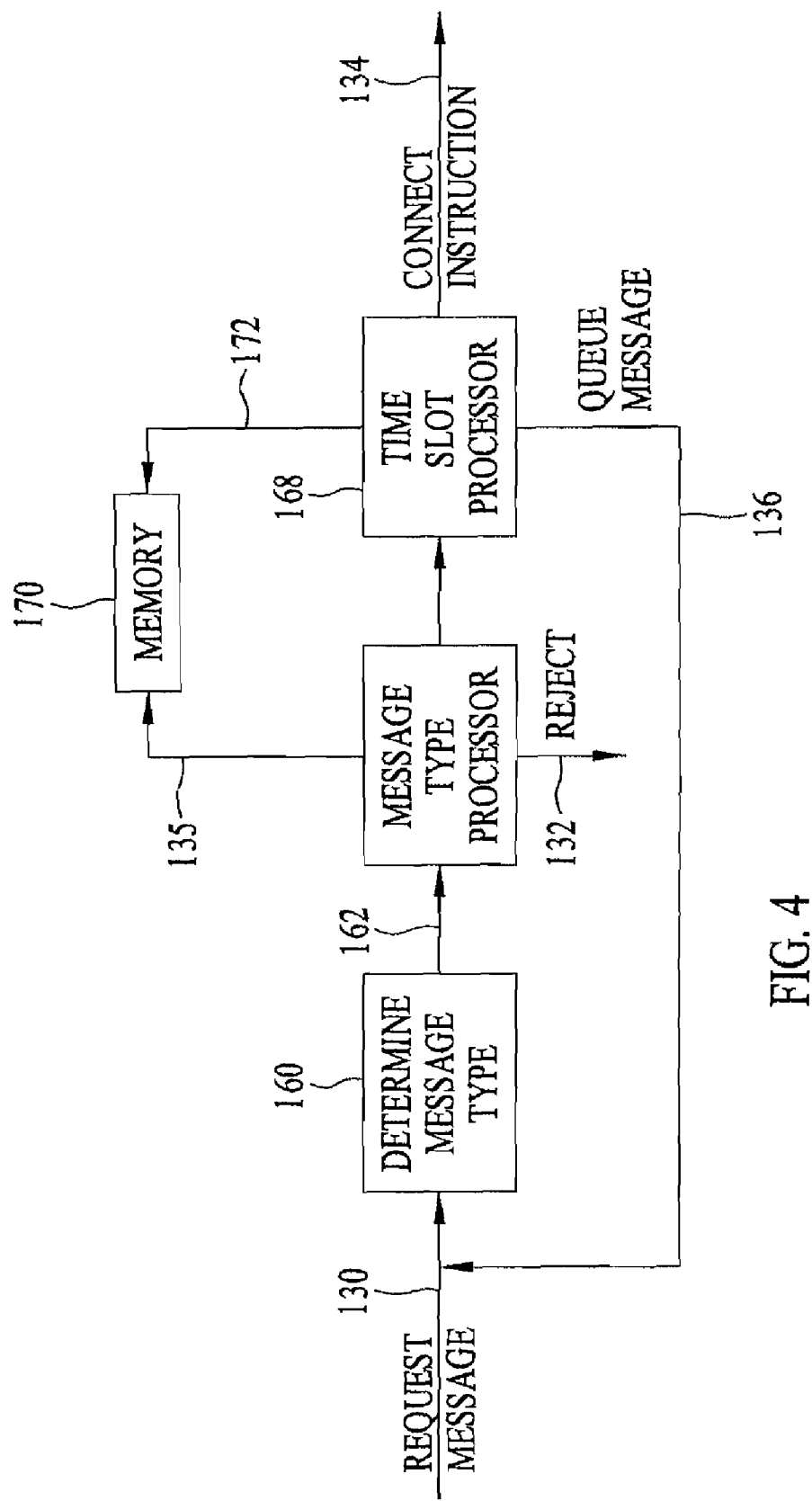
FIG. 4 is a block diagram showing the operation of the control processor.

The operation of control processor 114 is further described in detail with reference to FIG. 4. Control processor 114 receives message request 130 in which the type of resources R, base addresses of one or more terminals T, and sub-addresses of one or more resources R to which the message is to be sent are encoded. The requester resource R may be a fax machine, telephone, computer, or any other type of device that generates a data signal. In network 110, messages generally may only be sent between resources R of like type, as for example, between telephones, between computers, or between fax machines. Messages generally cannot be sent between unlike resources R.

At step 160, the type of resource R that has generated message request 130 is determined and message type output signal 162 is provided to message type processor 164. The type of communications request (e.g., point-to-point, conference, etc.) and the particular communications channel over which the message is to be sent are encoded in message request 130. Message type processor 164 determines the type of communications request, whether the resources R are compatible devices, and whether resources R are available to receive the message, in accordance with well-known techniques in the art. If resources R may not be connected, as for example, when the baud rates of the resources R at issue are not identical, message type processor 164 generates a reject signal 132. If a connection or communications link may be established between resources R, output signal ("OK") 166 is provided to time slot processor 168.

Time slot processor 168 determines if a time slot exists in which a message may be transmitted on a control channel or any available slave channels so that it may be received by all of the intended requested resources R. If a time slot presently exists in which a message may be sent so that it may be received by all of the requested resources R at a time when the requested resources R are receptive to receiving the message, then time slot processor 168 generates a connect instruction 134 that is provided to the requester resource R through via communications router 112. If a time slot does not presently exist in which a message may be sent so that it may be received by all of the requested resources R, then time slot processor 168 generates a queue instruction 136 that is provided as an input to step 160, in the form of a message request 130.

Figure 5:
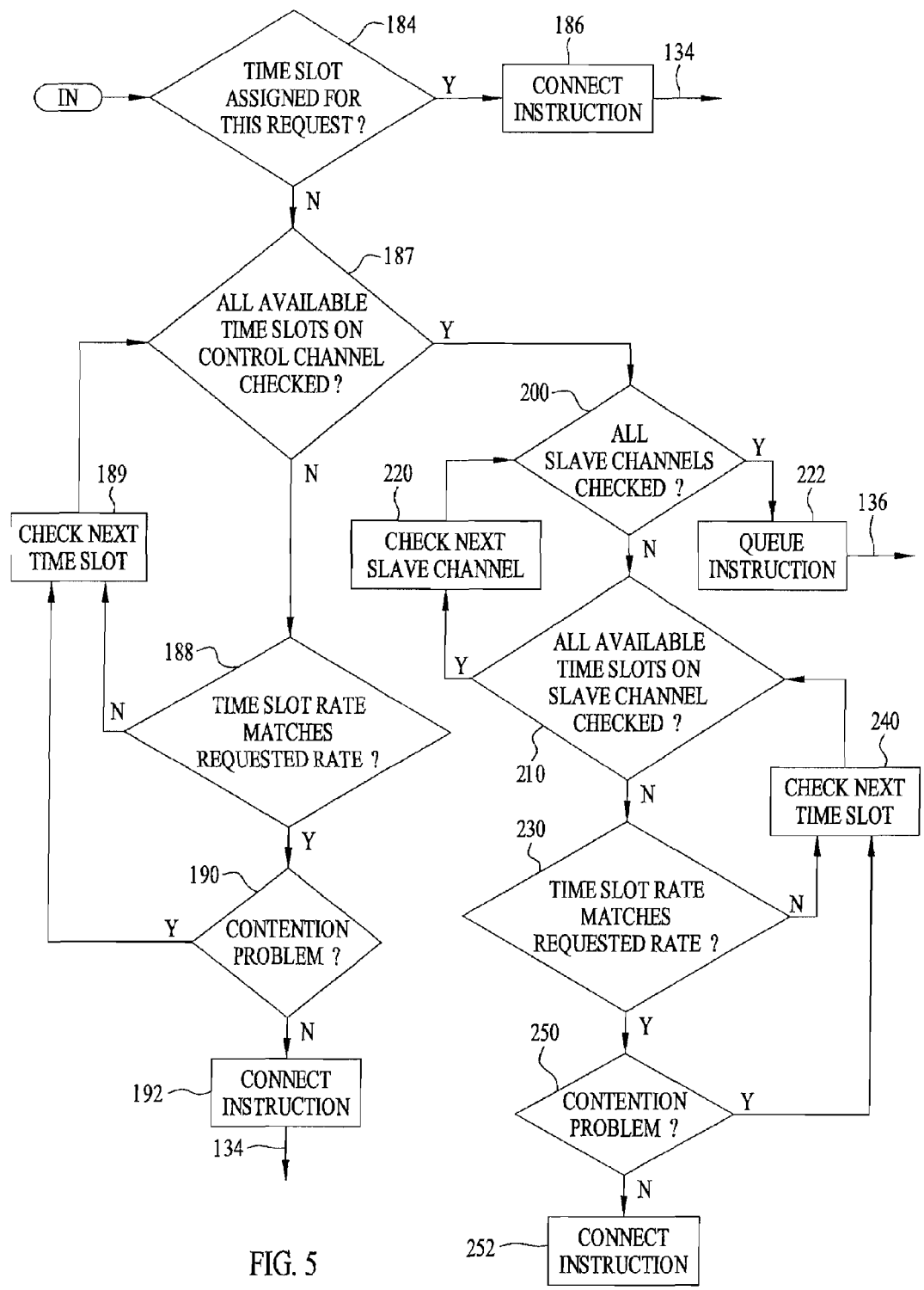
FIG. 5 is a flowchart detailing the operation of the time slot processor.

FIG. 5 provides a more detailed description of the operation of time slot processor 168.

(a) In step 184, time slot processor 168 determines if a time slot has already been assigned for message request 130. If the determination is YES, time slot processor 168 generates a connect instruction 134 in step 186. If the determination is NO, time slot processor 168 proceeds to step 187 to determine if a time slot exists in which a message may be transmitted on a control channel.

(b) In step 187, a determination is made as to whether all available time slots on a control channel have been checked using well-known techniques in the art. If the determination is YES, time slot processor 168 proceeds to step 200 to determine if a time slot exists in which a message may be transmitted on any available slave channels so that it may be received by all of the intended requested resources R. If the determination is NO, time slot processor 168 proceeds to step 188.

(c) In step 188, a determination is made as to whether a baud rate match exists between the time slot being examined and all of the resources R to be connected. If the determination is YES, time slot processor 168 proceeds to step 190. If the determination is NO, time slot processor 168 proceeds to step 189 to check the next time slot.

(d) In step 190, time slot processor 168 determines whether a contention problem exists using well-known techniques in the art. If the determination is YES, time slot processor 168 proceeds to step 189 to check the next time slot. If the determination is NO, time slot processor 168 generates a connect instruction 134 in step 192.

(e) in step 200, time slot processor 168 determines whether all slave channels have been checked. If the determination is YES, time slot processor 168 generates a queue instruction 136 in step 222. If the determination is NO, time slot processor 168 proceeds to step 210 to determine if a time slot exists in which a message may be transmitted on the slave channel.

(f) In step 210, a determination is made as to whether all available time slots on the slave channel have been checked using well-known techniques in the art. If the determination is YES, time slot processor 168 proceeds to step 220 to check the next slave channel. If the determination is NO, time slot processor 168 proceeds to step 230.

(g) in step 230, a determination is made as to whether a baud rate match exists between the time slot being examined and all of the resources R to be connected. If the determination is YES, time slot processor 168 proceeds to step 250. If the determination is NO, time slot processor 168 proceeds to step 240 to check the next time slot.

(h) In step 250, time slot processor 168 determines whether a contention problem exists using well-known techniques in the art. If the determination is YES, time slot processor 168 proceeds to step 240 to check the next time slot. If the determination is NO, time slot processor 168 generates a connect instruction 134 in step 252.

Clearly, many modifications and variations of the system and method for multiplying communications capacity on a TDMA network using slave channeling are possible in light of the above teachings. It is therefore to be understood that within the scope of the appended claims the system and method for multiplying communications capacity on a TDMA network using slave channeling may be practiced otherwise than as specifically described.

We claim:

1. A communications system comprising:
   at least two communications resource sets, wherein each resource set includes at least one communications resource, wherein each communications resource has a sub-address;
   a communications terminal connected to each of the at least two communications resource sets for transmitting and receiving messages between the resource sets, wherein each communications terminal has a unique base address;
   a communications router operably coupled to each communications terminal;
   a control processor configured to search within a periodic time frame comprising multiple time slots for an available time slot on a control channel at frequency $f_c$ or, if a time slot is not available on the control channel, to search within a periodic time frame comprising multiple time slots for an available time slot on a slave channel at frequency $f_s$, wherein the control channel and the slave channel have the same frame format; and
   wherein the control processor further comprises a memory, and wherein the memory is configured to store the sub-address for each communications resource, the base address for each communications terminal, configuration data that identifies the type of communication resource set, data rate, propagation time, time slot assignments, duplex type, and operating channel for each communication resource and communication terminal.

2. The system of claim 1, wherein at least one of the communications terminals is a full duplex transmitting and receiving station.

3. The system of claim 1, wherein at least one of the communications terminals is a half duplex transmitting and receiving station.

4. The system of claim 1, wherein the communications resource sets are telephones.

5. The system of claim 1, wherein the communications resource sets are fax machines.

6. The system of claim 1, wherein the communications resource sets are computers.

7. The system of claim 1, wherein the router is a message relay station.

8. The system of claim 7, wherein the message relay station is a communications satellite.

9. The system of claim 7, wherein the message relay station is a local area network.

* * * * *